United States Patent [19]

Nakajima et al.

[11] Patent Number: 5,483,401
[45] Date of Patent: Jan. 9, 1996

[54] ROTARY HEAD DRUM HAVING A CONNECTING MEMBER FOR PROVIDING ELECTRICAL CONDUCTION

[75] Inventors: Toshihiko Nakajima; Hiroo Edakubo; Kiyoshi Kumagai, all of Kanagawa, Japan

[73] Assignee: Canon Kabushiki Kaisha, Tokyo, Japan

[21] Appl. No.: 260,686

[22] Filed: Jun. 16, 1994

Related U.S. Application Data

[63] Continuation of Ser. No. 737,068, Jul. 29, 1991, abandoned.

[30]  Foreign Application Priority Data

Aug. 8, 1990  [JP]  Japan ................................ 2-208247
Mar. 12, 1991 [JP]  Japan ................................ 3-046563

[51] Int. Cl.$^6$ ........................................... G11B 5/27
[52] U.S. Cl. ........................... 360/108; 360/84; 360/104; 360/130.22
[58] Field of Search ............................... 360/107, 108, 360/84, 104, 130.22

[56]  References Cited

U.S. PATENT DOCUMENTS

| | | | |
|---|---|---|---|
| 4,672,489 | 6/1987 | Wada et al. | 360/104 |
| 4,695,907 | 9/1987 | Inaji et al. | 360/84 |
| 4,725,910 | 2/1988 | Kaku et al. | 360/107 |
| 4,835,645 | 5/1989 | Ohji et al. | 360/84 |
| 4,891,726 | 1/1990 | Suma et al. | 360/84 |
| 5,010,432 | 4/1991 | Fukushima et al. | 360/108 |
| 5,019,926 | 5/1991 | Van Thuijl et al. | 360/84 |
| 5,023,734 | 6/1991 | Tamaki | 360/84 |
| 5,075,809 | 12/1991 | Heinz et al. | 360/84 |
| 5,113,298 | 5/1992 | Fukushima et al. | 360/84 |
| 5,126,906 | 6/1992 | Ohji et al. | 360/108 |
| 5,251,084 | 10/1993 | Nanjyo et al. | 360/104 |
| 5,278,714 | 1/1994 | Hong | 360/107 |

FOREIGN PATENT DOCUMENTS

| | | |
|---|---|---|
| 59-119505 | 7/1984 | Japan . |
| 63-149409 | 6/1988 | Japan . |

*Primary Examiner*—Georgia Y. Epps
*Assistant Examiner*—Kim-Kwok Chu
*Attorney, Agent, or Firm*—Robin, Blecker, Daley & Driscoll

[57]  ABSTRACT

In a recording or reproducing apparatus arranged to carry out recording or reproduction of a signal while keeping a magnetic tape wrapped around a rotary head drum equipped with a head, the upper cylinder of the rotary head drum is provided with a rotor core which constitutes part of a rotary transformer for carrying out signal exchange between the head and an external circuit. An elastically deformable contact is held by a holder secured to the rotor core, and includes a plurality of conductive portions, each conducting electricity between opposed faces of the elastically deformable contact, and a cutout defined in a middle portion thereof. The elastically deformable contact is pressed from opposed sides between a conductive pattern connected to the magnetic head and a conductive pattern connected to the rotor core so that it can be brought into pressure contact with both of the conductive patterns, thereby providing electrical conduction between the head and the rotor core.

16 Claims, 4 Drawing Sheets

FIG.8
FIG.9
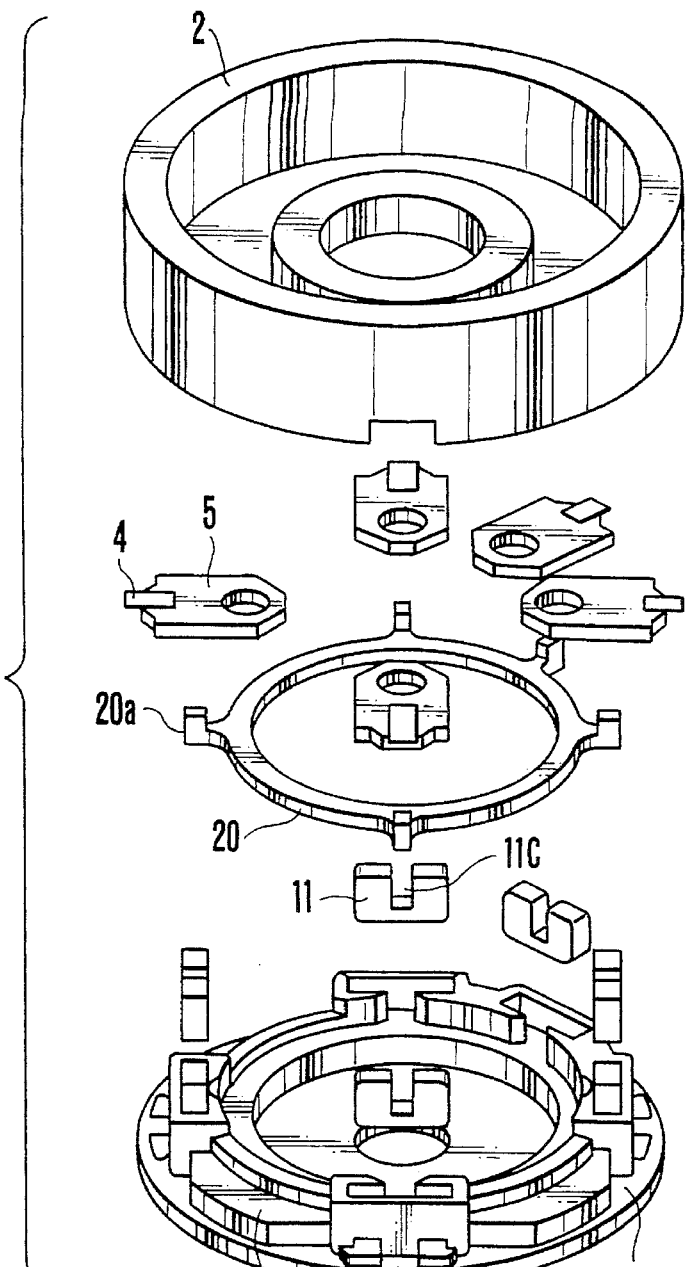
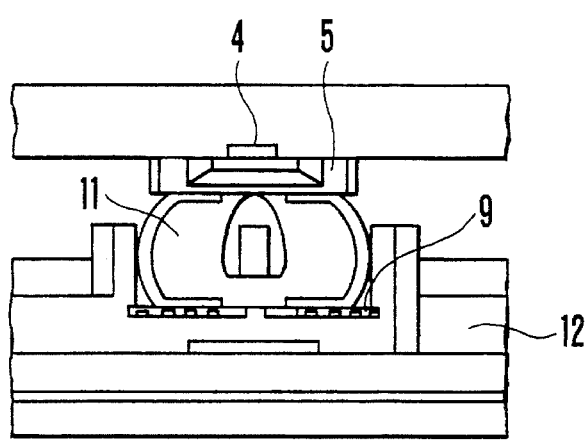

ROTARY HEAD DRUM HAVING A CONNECTING MEMBER FOR PROVIDING ELECTRICAL CONDUCTION

This is a continuation of prior application Ser. No. 07/737,068, filed Jul. 29, 1991 (now abandoned).

BACKGROUND OF THE INVENTION

1. Field of the Invention

The present invention relates to a recording or reproducing apparatus which has a rotary drum unit and which is arranged to record or reproduce a signal by using a tape.

2. Description of the Related Art

As one conventional example of this kind of recording or reproducing apparatus, a video tape recorder or the like is known which is arranged to carry out recording or reproduction of a signal while keeping a magnetic tape wrapped around a rotary drum unit equipped with a magnetic head by a predetermined angle such as about 180 degrees or about 360 degrees. In general, the rotary drum unit includes a rotating upper cylinder and a stationary lower cylinder, and the upper cylinder is provided with a pair of magnetic heads which are spaced apart by, for example, 180 degrees. Connection between the magnetic heads and an external electronic circuit is carried out via a rotary transformer disposed in the rotary drum unit.

A method for connecting the magnetic heads and the rotary transformer via a conductive member is disclosed in, for example, Japanese Laid-open Patent Application No. Sho 59-119505 or Japanese Laid-open Utility Model Application No. Sho 63-149409. In such a method, two conductive members per magnetic head are secured to a holder having electrical insulating properties, and the holder is disposed between the magnetic heads and each conductive pattern of the rotary transformer.

In a more general method using no elastic member, electrical connection between the magnetic heads and the rotary transformer (rotor core) disposed in the upper cylinder has been provided by extending lead wires connected to a head base and lead wires of the rotary transformer (rotor core) onto a conductive circuit board mounted on the top face of the upper cylinder and connecting these lead wires on the conductive circuit board, as by soldering.

In such a rotary drum unit, however, since the lead wires are used to provide electrical connection between the magnetic heads and the rotary transformer, the lead wires must be connected at a large number of points. Specifically, there has been the problem that the operation of connecting the lead wires becomes complicated due to factors such as the requirements that the lead wires be connected to the head base; the lead wires from the head base be connected to the conductive circuit board; the lead wires from the rotary transformer be connected to the conductive circuit board; and so on.

Although the magnetic heads and the rotary transformer are disposed relatively close to each other within the upper cylinder, long lead wires must be used since the lead wires connected to both of them are led to the conductive circuit board provided on the upper cylinder. This leads to the problem that the cost of products increases.

An arrangement for solving the above-described problems is disclosed in the aforesaid Japanese Laid-open Patent Application No. Sho 59-119505, Japanese Laid-open Utility Model Application No. Sho 63-149409, and so on. FIG. 1 is an exploded perspective view diagrammatically showing a rotary magnetic head apparatus (corresponding to the rotary drum unit) according to one embodiment of the device set forth in Japanese Laid-open Utility Model Application No. Sho 63-149409.

The rotary drum unit 1 consists of a rotating upper drum 2 and a stationary lower drum 3. Head bases 5 each of which holds a magnetic head 4 are secured to the upper drum 2, and a head circuit board 7 is secured to each of the head bases 5. The head circuit board 7 has first conductive patterns 6a and 6b connected to the coil of the associated magnetic head 4.

A conductive circuit board 10 which has second conductive patterns 9a and 9b connected to a transformer coil is secured to a rotor core 8a of a rotary transformer 8.

Contacts 11a and 11b are respectively inserted into cutouts 13a and 13b formed in a holder 12. Each of the contacts 11a and 11b is made of an elastically deformable member which conducts electricity between opposed faces thereof. The holder 12 is secured to the head base 5 by the engagement between the head base 5 and engagement projections 14a, 14b and 14c. The upper drum 2 and the lower drum 3 are combined in such a manner that the contacts 11a and 11b are compressed and elastically deformed to enable electrical conduction, respectively, between the first conductive pattern 6a and the second conductive pattern 9a and between the first conductive pattern 6b and the second conductive pattern 9b.

However, the above-described conventional example has the following disadvantages since elastic material such as silicone rubber is used for the contacts 11a and 11b which serve as conductive members:

(1) It is difficult to reliably hold the conductive members (contacts) 11a and 11b on the holder 12, and they easily come off during assembly.

(2) While the holder 12 combined with the conductive members 11a and 11b is being secured to the upper drum 2, each of the conductive members 11a and 11b is compressed in two directions and easily deformed. As a result, since the magnetic heads are not held in uniform contact with the conductive patterns 6a, 6b and 9a, 9b, conduction failure easily occurs.

(3) As the number of magnetic heads to be mounted is increased, the number of conductive members increases accordingly, and the operation of securing the conductive members to the holder 12 and that of securing the holder 12 to the upper drum 2 become complicated. For the aforesaid reasons, imperfect products may be manufactured or the reliability of products may be impaired, with the result that high cost and numerous steps are required for quality control.

SUMMARY OF THE INVENTION

A primary object of the present invention is to provide a recording or reproducing apparatus with heads and rotary transformer of which can be connected reliably and easily during assembly.

To achieve the above object, according to the present invention, there is provided a recording or reproducing apparatus arranged to carry out recording or reproduction of a signal while keeping a magnetic tape wrapped around a rotary head drum equipped with a head. In such an apparatus, the upper cylinder of the rotary head drum is provided with a rotor core which constitutes part of a rotary transformer for carrying out signal exchange between the head and an external circuit. An elastically deformable contact is held by a holder secured to the rotor core, and includes a plurality of conductive portions, each conducting electricity between opposed faces of the elastically deformable contact, and a cutout defined in a middle portion thereof. The elastically deformable contact is pressed from opposed sides between a conductive pattern connected to the head and a conductive pattern connected to the rotor core so that it can be brought into pressure contact with both of the conductive patterns, thereby providing electrical conduction between the head and the rotor core.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIG. 8 is an exploded perspective view showing the essential portions of a rotary drum unit according to the embodiment; and FIG. 9 is a diagrammatic view showing the state in which a contact is pressed and elastically deformed.

DETAILED DESCRIPTION OF THE PREFERRED EMBODIMENT

A preferred embodiment of the present invention will be described below with reference to the accompanying drawings.

Figure 1:
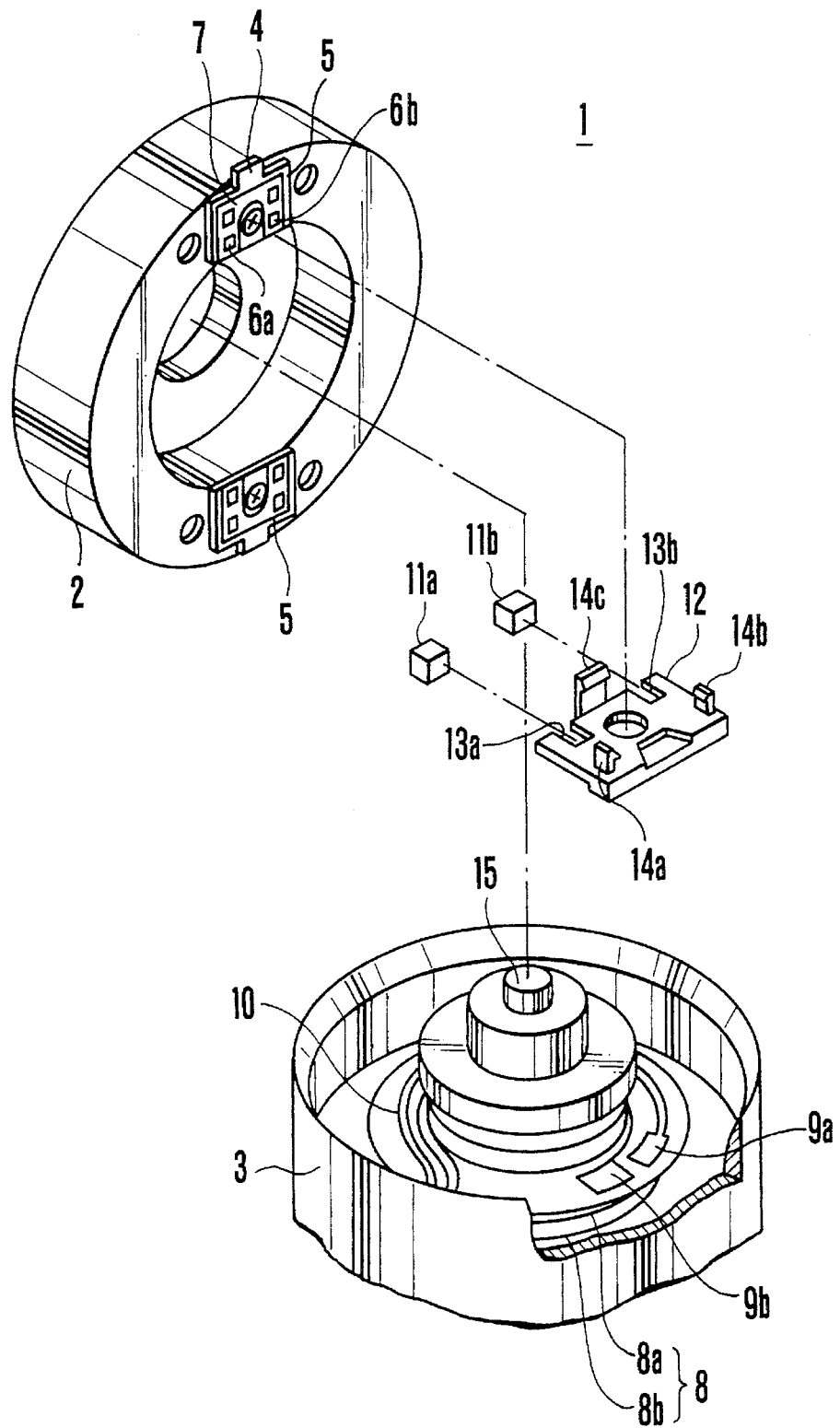
FIG. 1 is an exploded perspective view showing the essential portions of a rotary drum unit in a conventional example.
Figure 2:
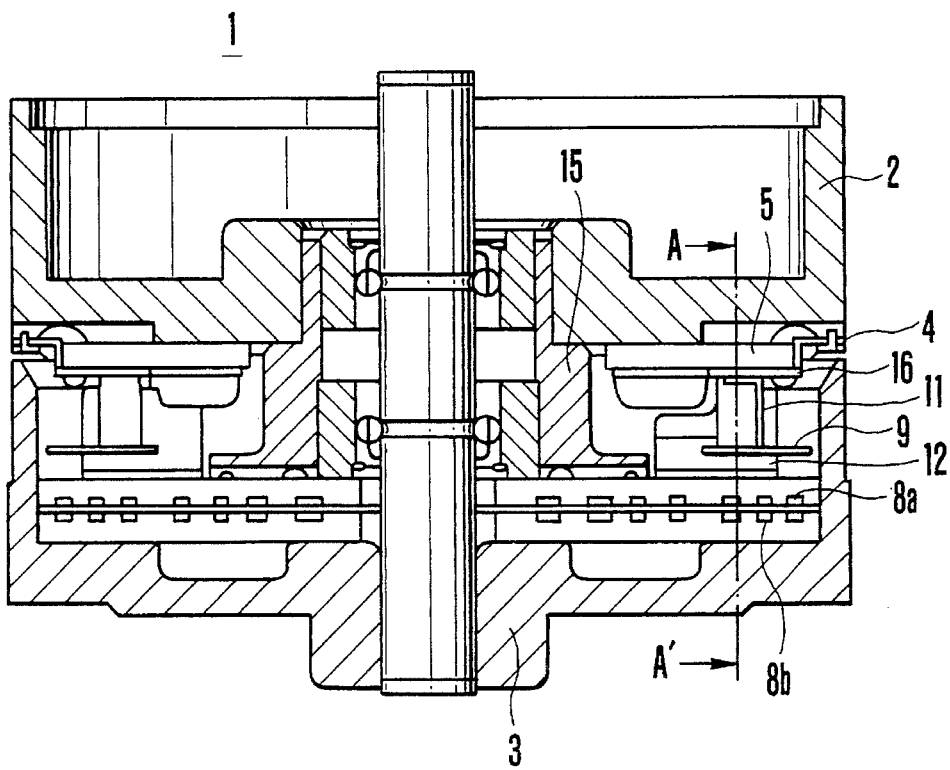
FIG. 2 is a diagrammatic cross-sectional view showing a rotary drum unit for use with one embodiment of the present invention.
Figure 3:
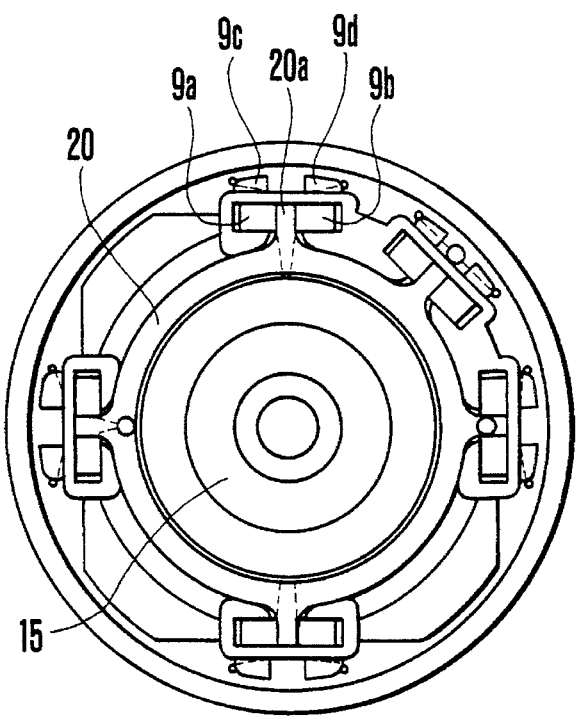
FIG. 3 is a diagrammatic plan view showing a lower cylinder which constitutes part of an assembled rotary drum unit.
Figure 4:
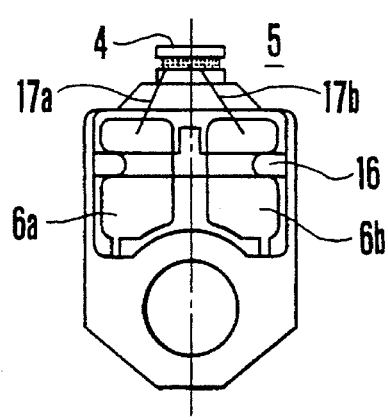
FIG. 4 is a diagrammatic bottom plan view showing a head base.

FIG. 2 is a diagrammatic cross-sectional view showing a rotary drum unit for use with one embodiment of the present invention, FIG. 3 is a diagrammatic plan view showing a lower cylinder which constitutes part of an assembled rotary drum unit, and FIG. 4 is a diagrammatic bottom plan view showing a head base. In these figures, identical reference numerals are used to denote the identical or corresponding portions used in the conventional example shown in FIG. 1.

As shown in FIG. 2, a rotary drum unit 1 includes an upper cylinder 2, a lower cylinder 3, head bases 5, conductive-pattern circuit boards 9, contacts 11, a holder 12 and other associated elements.

The upper cylinder 2 is secured to a rotary support 15, which projects from the lower cylinder 3, in such a manner that the upper cylinder 2 can rotate with respect to the lower cylinder 3. Head bases 5 are secured to the bottom face of the upper cylinder 2 which is opposed to the lower cylinder 3. A magnetic head 4 is fixed to each of the head bases 5 by adhesion, and a head circuit board 16 is disposed on the face of each head base 5 which is opposed to the lower cylinder 3. As shown in FIG. 4, the head circuit board 16 has first conductive patterns 6a and 6b which are respectively electrically connected to end portions 17a and 17b of a coil which is wound around the magnetic head 4. Each of the conductive patterns 6a and 6b occupies a relatively wide area within the head circuit board 16.

The aforesaid rotary support 15 is rotatably inserted through the lower cylinder 3, and a rotary transformer 8 is disposed therein. The rotary transformer 8 consists of a rotor core 8a which rotates integrally with the rotary support 15 and a stator core 8b which is fixed to the lower cylinder 3.

The holder 12 is made of synthetic resin and has the conductive-pattern circuit boards 9 formed by insert molding. The conductive-pattern circuit boards 9 are connected to the rotor core 8a. The holder 12 is bonded to the rotor core 8a so that when the upper cylinder 2 is fitted in position, conductive-pattern circuit boards 9a and 9b are respectively opposed to the conductive patterns 6a and 6b provided on each of the head bases 5 which support the magnetic heads 4. Coils led from the rotor core 8a are connected to conductive-pattern circuit boards 9c and 9d, respectively.

Figure 5:
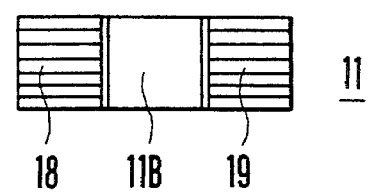
FIG. 5 is a diagrammatic plan view showing a contact.
Figure 6:
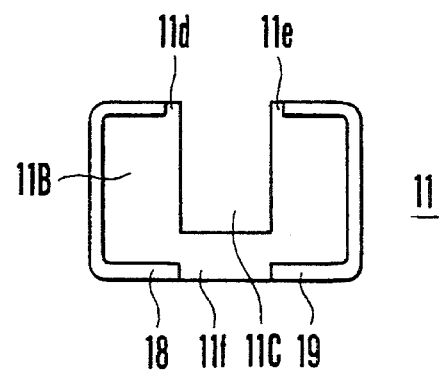
FIG. 6 is a front elevational view showing the contact of FIG. 5.

FIG. 5 is a plan view showing one of the contacts 11 and FIG. 6 is a front elevational view showing the same. As shown in FIG. 6, the contact 11 has a body 11B made of an elastically deformable material such as silicone rubber, and the body 11B has an approximately U-like shape which has a cutout 11C formed in its middle part. Opposite side surfaces of the body 11B and part of the top and bottom surfaces thereof are coated with a pair of conductive films 18 and 19 to form a pair of conductive portions. The silicone rubber defined between the opposed top ends of the conductive films 18 and 19 constitute electrically insulating portions 11d and 11e, while the silicone rubber defined between the opposed bottom ends of the conductive films 18 and 19 constitutes an electrically insulating portion 11f, whereby the conductive film 18 and the conductive film 19 are electrically insulated from each other.

Since the conductive films 18 and 19 are made of material having flexibility, there is no risk that they may peel due to the elastic deformation of the body 11B. The conductive films 18 and 19 are formed on the outer surface of the body 11B, as by vapor deposition. In the above-described arrangement, electrical conduction is provided between the opposed top and bottom faces of the contact 11.

Figure 7:
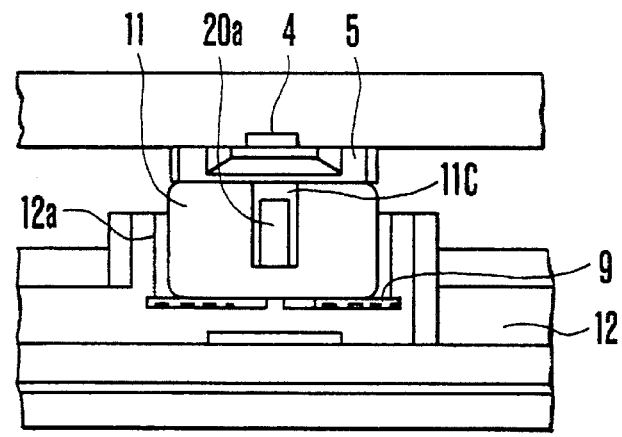
FIG. 7 is a cross-sectional view taken along line A—A' of FIG. 2.

As shown in FIGS. 7 and 8, a stopper 20 having projections 20a is bonded to or press-fitted into the holder 12 by a small pressure, and the contacts 11 are restricted in position by the engagement between their cutouts 11C and the respective projections 20a. Since small gaps are respectively formed between the projections 20a and the contacts 11 and between holder wall surfaces 12a and the contacts 11, the contacts 11 are not elastically deformed before the upper cylinder 2 is mounted.

Although the combination of the contact 11 and the conductive-pattern circuit board 9 is needed for each of the head bases 5, illustration and explanation are omitted for the sake of simplicity.

The assembly of each of the above-described constituent parts will be described below with reference to FIGS. 2, 3 and 4. First, the upper cylinder 2 to which have been secured the head bases 5 is secured to the rotor support 15. As described above, the upper cylinder 2 is secured to the rotor support 15 in such a manner that the conductive patterns 6a and 6b of each of the head bases 5 are approximately opposed to the conductive-pattern circuit boards 9a and 9b, respectively. Accordingly, when the upper cylinder 2 is secured to the rotor support 15, each of the contacts 11 comes into contact with the conductive patterns 6a and 6b. The height dimension of each of the contacts 11 is selected to be greater than the predetermined dimension of the spacing between the head base 5 and the conductive-pattern circuit board 9. Accordingly, when the assembly is completed, the contacts 11 are elastically deformed by pressure and the conductive patterns 6a and 6b of each of the head bases 5 are respectively pressed in contact with the conductive-pattern circuit boards 9a and 9b, so that the magnetic heads 4 are electrically connected to the coil of the rotor core 8a.

As described above, the contacts 11 are not elastically deformed before the upper cylinder 2 is mounted, that is to say, they are elastically deformed for the first time when the upper cylinder 2 is mounted. Accordingly, the contacts 11 are prevented from falling down due to deformation before assembly of the upper cylinder 2, whereby it is possible to prevent the contacts 11 from causing contact failure during the assembly of the upper cylinder 2.

When the assembly of the upper cylinder 2 is completed, each of the contacts 11 is elastically deformed by pressure as shown in FIG. 9. However, by providing the electrically insulating portions 11d and 11e on each of the contacts 11, it is possible to prevent short-circuit from occurring due to the contact between the conductive films 18 and 19.

In the above-described embodiment, the structure of each of the contacts 11 is such that the body 11B made of an elastically deformable material such as silicone rubber is coated with the conductive films 18 and 19. However, this structure is not a limiting one. For example, a flexible circuit board having a conductive pattern formed thereon may be disposed on the body 11B. Otherwise, the body 11B itself may be formed of anisotropic conductive rubber.

As described above, according to the present embodiment, a rotary head drum for carrying out recording or reproduction of a signal while keeping a magnetic tape wrapped around itself includes an upper cylinder provided with a magnetic head for carrying out exchange of a signal with the magnetic tape and a rotor core which constitutes part of a rotary transformer for carrying out signal exchange between the magnetic head and an external circuit.

An elastically deformable contact which serves as means for conducting electricity between the magnetic head and the rotor core is held by a holder secured to the rotor core. The elastically deformable contact includes a plurality of conductive portions, each conducting electricity between opposed faces of the elastically deformable contact, and a cutout defined in a middle portion thereof. The elastically deformable contact is pressed from opposed sides between a conductive pattern connected to the magnetic head and a conductive pattern connected to the rotor core so that it can be brought into pressure contact with both of the conductive patterns, thereby providing electrical conduction between the magnetic head and the rotor core.

Accordingly, by providing a plurality of conductive portions on a single contact, it is possible to reduce the number of required parts to not more than one half the number of parts which have conventionally been required. Also, since assembly is effected with the middle cutout formed in each contact being held by the holder secured to the rotor core and, in addition, the contact has elasticity, perfect electrical conduction can be accomplished and also easy and reliable assembly can be achieved, thereby enabling reliability to be improved.

In addition, by providing electrically insulating portions between opposed ends of the conductive portions of the contact, it is possible to prevent short-circuiting from occurring due to the contact between the conductive portions even if the contact body is elastically deformed, whereby durability and reliability can be improved.

Further, since the holder for holding contacts is secured to the rotor core, the conductive portions between the holder and the rotary transformer can be integrated to reduce the number of required parts, thereby achieving cost reduction.

According to the present invention, as described above, since the number of required parts can be reduced, assembly facilitated, and reliable electrical conduction achieved, it is possible to provide a recording or reproducing apparatus of improved reliability.

What is claimed is:

1. A recording or reproducing apparatus arranged to carry out recording or reproduction of a signal while keeping a magnetic tape wrapped around a rotary head drum equipped with a head, comprising:

(a) a rotating cylinder which constitutes part of the rotary head drum;

(b) a rotor core which is included in said cylinder and which constitutes part of a rotary transformer for carrying out signal exchange between the head and an external circuit;

(c) a holder secured to said rotor core; and (d) a contact having a cutout portion formed approximately in its middle portion and a plurality of conductive portions provided on opposite sides of the cutout portion, said contact being held by said holder for providing connection between a conductive pattern of said head and a conductive pattern of said rotor core.

2. A recording or reproducing apparatus according to claim 1, wherein said holder has a projection for holding said contact by engaging with the cutout portion of said contact.

3. A recording or reproducing apparatus according to claim 1, wherein an electrically insulating portion is defined between opposed ends of the conductive portions.

4. A recording or reproducing apparatus according to claim 1, wherein the conductive portions are provided in a pair.

5. A recording or reproducing apparatus according to claim 1, wherein said contact is made of an elastic material.

6. A connecting member for electrically connecting a first set of conductive patterns and a second set of conductive patterns, each of the first and second sets of conductive patterns having a plurality of conductive patterns, comprising:

(a) a body;

(b) a cutout portion formed approximately in the middle of said body; and (c) a plurality of U-shaped conductive portions formed on said body on opposite sides of said cutout portion, one end of said U-shaped conductive portion connecting the conductive pattern of one of said first and second sets of conductive patterns and other end of said U-shaped conductive portion connecting the conductive pattern of the other of said first and second sets of conductive patterns.

7. A connecting member according to claim 6, wherein an electrically insulating portion is defined between opposed ends of said conductive portions.

8. A connecting member according to claim 6, wherein each of said body and said conductive portions is made of an elastic material.

9. A connecting member according to claim 6, wherein each of said conductive portions includes a conductive film deposited for providing conductivity.

10. An electronic apparatus, comprising:
(a) a first set of conductive patterns and a second set of conductive patterns, each having a plurality of conductive patterns;
(b) a connecting member for electrically connecting said first and second sets of conductive patterns, including:
a body;
a first engaging portion formed approximately in the middle of said body;
a plurality of U-shaped conductive portions formed on said body on opposite sides of said first engaging portion, one end of said U-shaped conductive portion connecting the conductive pattern of one of said first and second sets of conductive patterns and the other end of said U-shaped conductive portion connecting the conductive pattern of the other of said first and second sets of conductive patterns; and
(c) a second engaging portion for engaging said first engaging portion and located between said first and second sets of conductive patterns.

11. An electronic apparatus according to claim 10, wherein an electrically insulating portion is defined between opposed ends of said conductive portions.

12. An electronic apparatus according to claim 10, wherein the connecting member is held by a holding member and connects the first and second sets of conductive patterns.

13. An electronic apparatus according to claim 12, wherein the holding member is secured to either one of the first and second sets of conductive patterns.

14. An electronic apparatus according to claim 12, wherein said first engaging portion is formed as a cutout portion in said body.

15. An electronic apparatus according to claim 14, wherein the holding member has a projection which engages with the cutout portion formed in the connecting member.

16. An electronic apparatus according to claim 13 or 15, wherein the first and second sets of conductive patterns are rotatably arranged.

* * * * *